US009176849B2

(12) United States Patent
Tripp et al.

(10) Patent No.: US 9,176,849 B2
(45) Date of Patent: Nov. 3, 2015

(54) PARTITIONING OF PROGRAM ANALYSES INTO SUB-ANALYSES USING DYNAMIC HINTS

(71) Applicant: GlobalFoundries U.S. 2 LLC, Hopewell Junction, NY (US)

(72) Inventors: Omer Tripp, Har-Adar (IL); Marco Pistoia, Amawalk, NY (US); Salvatore A. Guarnieri, New York, NY (US)

(73) Assignee: GlobalFoundries U.S. 2 LLC, Hopewell Junction, NY (US)

( * ) Notice: Subject to any disclaimer, the term of this patent is extended or adjusted under 35 U.S.C. 154(b) by 156 days.

(21) Appl. No.: 13/864,599

(22) Filed: Apr. 17, 2013

(65) Prior Publication Data

US 2014/0317747 A1    Oct. 23, 2014

(51) Int. Cl.
    *G06F 11/36*     (2006.01)
    *G06F 21/57*     (2013.01)

(52) U.S. Cl.
    CPC .......... *G06F 11/3644* (2013.01); *G06F 21/577* (2013.01)

(58) Field of Classification Search
    CPC .............. G06F 21/577; G06F 11/3644; G06F 11/3612; G06F 11/3636; G06F 11/3664
    USPC .......... 726/25, 26, 1; 717/103, 106, 127, 128, 717/130–133
    See application file for complete search history.

(56) References Cited

U.S. PATENT DOCUMENTS

| 8,527,965 | B2 * | 9/2013 | Cifuentes et al. | ............. 717/131 |
| 2011/0154300 | A1 * | 6/2011 | Rao et al. | ...................... 717/133 |
| 2011/0191855 | A1 | 8/2011 | De Keukalaere et al. | ...... 726/25 |
| 2012/0017262 | A1 | 1/2012 | Kapoor et al. | .................... 726/1 |

FOREIGN PATENT DOCUMENTS

WO    WO 2007/130034 A1    11/2007

OTHER PUBLICATIONS

Tripp et al, "TAJ: Effective Taint analysis of Web Applications", PLDI'09, Jun. 15-20, Dublin, Ireland.*

* cited by examiner

*Primary Examiner* — Kambiz Zand
*Assistant Examiner* — Noura Zoubair

(57) ABSTRACT

An exemplary method includes performing a first static analysis to locate elements within a program and instrumenting the program to enable a subsequent dynamic analysis based on the located elements. The method includes executing the instrumented program and performing during execution analysis to determine individual sets of statements in the program affected by a corresponding element. The method includes partitioning the sets of statements into partitions based on one or more considerations, each partition including one or more of the elements. The method includes performing a second static analysis on the partitions of the program to produce results and outputting the results. The method may be performed for, e.g., security (e.g., taint) analysis, buffer overflow analysis, and typestate analysis. Apparatus and program products are also disclosed.

17 Claims, 4 Drawing Sheets

```
String name = request.getParameter("name"); /* Source statement */
String gender = request.getParameter("gender"); /* Source statement */
String sname = removeWhitespaces(name); /* Summary: argument -> return value */
String sgender = removeWhitespaces(gender); /* Summary: argument -> return value */
processByName(sname); /* Need to track 'sname' into one area X the code */
processByGender(sgender); /* Need to track 'sgender' into one area Y the code */
```

FIG. 1

PARTITIONING OF PROGRAM ANALYSES INTO SUB-ANALYSES USING DYNAMIC HINTS

BACKGROUND

This invention relates generally to analysis of program code and, more specifically, relates to static and dynamic analysis of program code.

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

Programs have become very complex and, with this complexity, have become vulnerable to attack or to errors. One way to prevent or reduce the occurrence of these vulnerabilities is by analyzing the program. Possible program analyses include the following: taint analysis, where "taint" is tracked from a source to some endpoint; buffer overflow analysis, which is useful in preventing buffer overflow attacks and includes checking that data written into a buffer does not exceed buffer size; and typestate analysis, which performs checking that correct use is made of an object given a current state of the object.

These types of program analysis may be performed dynamically or statically. Dynamic analysis is performed by executing the program and determining results based on the execution of the program. The program is typically modified, such as by instrumenting the program. Instrumenting the program refers to an ability, e.g., to diagnose errors and to write trace information. Programmers implement instrumentation in the form of code instructions that monitor specific components in a program (for example, instructions may output logging information to appear on screen or may write trace information to a file).

Static analysis is an analysis that involves examining the code of programs such as Web programs without executing the code of the program. Some type of model is (or models are) created of the code of the program, to estimate what would happen when the code actually is executed.

Static security analysis typically takes the form of taint analysis, where the analysis is parameterized by a set of security rules, each rule being a triple <Src,San,Snk> denoting the following:
1) source statements (Src) reading untrusted user inputs;
2) downgrader statements (San) endorsing untrusted data by either validating or sanitizing the untrusted data; and
3) sink statements (Snk) performing security-sensitive operations.

There are a number of techniques for analyzing taint flow from sources to sinks. These techniques also consider whether flow passed through a downgrader (also called an endorser) that performs downgrading of the taint. One set of techniques includes graphs such as call graphs. Call graphs are directed graphs that represent calling relationships between methods in a computer program.

Using such techniques, given security rule r, a flow from a source in $Src_r$ to a sink in $Snk_r$ that does not pass through a downgrader from $San_r$ comprises a potential vulnerability. This reduces security analysis to a graph reachability problem.

For small programs, the graph reachability problem is manageable. However, for large programs such as those used in many Web-based environments, the programs can contain thousands or hundreds of thousands of lines of code. As programs get larger, the graphs of those programs tend to increase very quickly in size.

Similar problems can occur with buffer overflow analysis and typestate analysis.

BRIEF SUMMARY

The following summary is merely intended to be exemplary. The summary is not intended to limit the scope of the claims.

An exemplary method includes performing a first static analysis to locate elements within a program and instrumenting the program to enable a subsequent dynamic analysis based on the located elements. The method includes executing the instrumented program and performing during execution analysis to determine individual sets of statements in the program affected by a corresponding element. The method includes partitioning the sets of statements into partitions based on one or more considerations, each partition including one or more of the elements. The method includes performing a second static analysis on the partitions of the program to produce results and outputting the results. The method may be performed for, e.g., security (e.g., taint) analysis, buffer overflow analysis, and typestate analysis. Apparatus and program products are also disclosed.

BRIEF DESCRIPTION OF THE SEVERAL VIEWS OF THE DRAWINGS

FIG. 1 is a snippet of program code used as an example;

FIG. 2, including

DETAILED DESCRIPTION

Figure 2A:
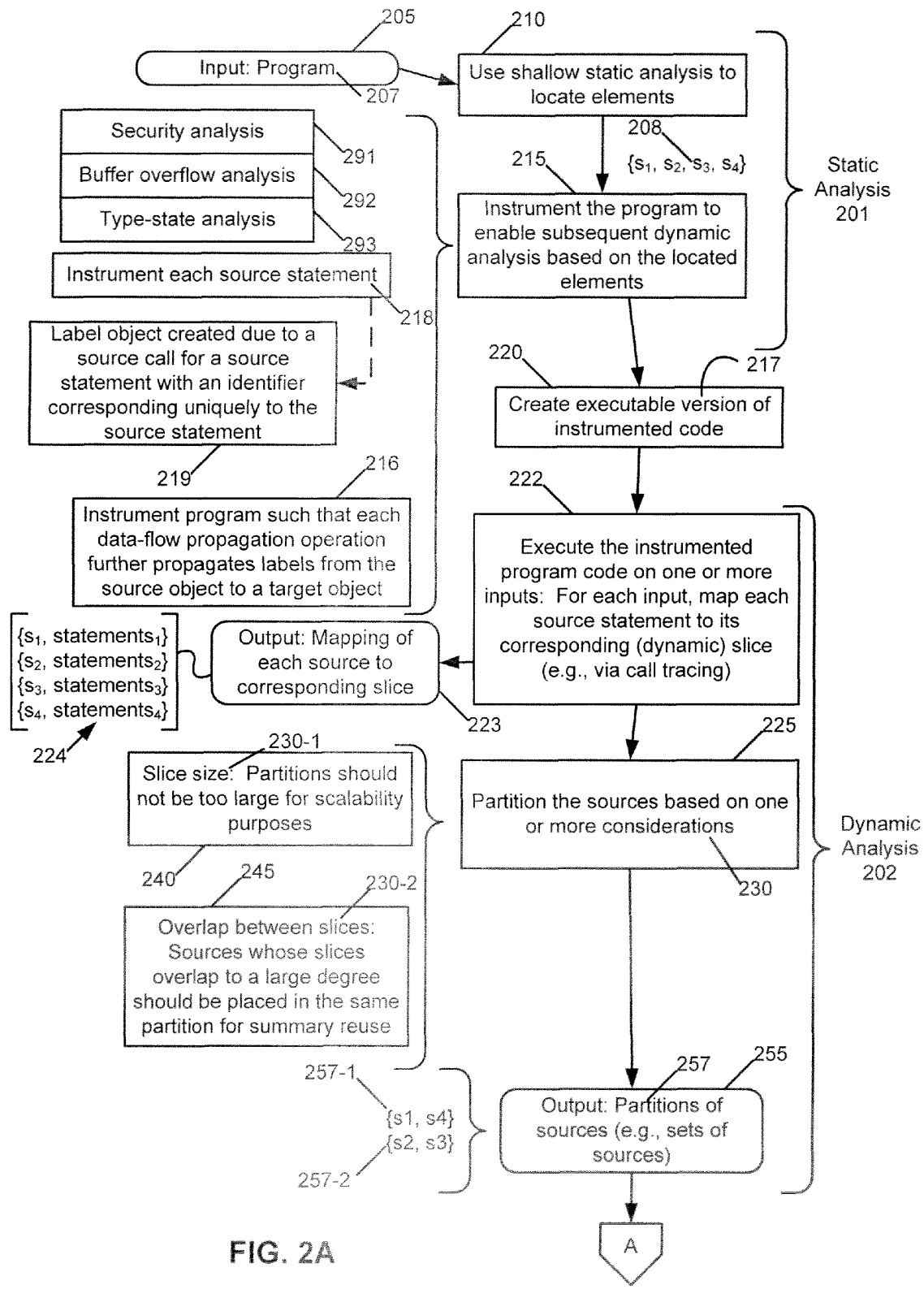
FIGS. 2A and 2B, is a logic flow diagram for performing partitioning of static security analysis into sub-analyses using dynamic hints, and illustrates the operation of an exemplary method, a result of execution of computer program instructions embodied on a computer readable memory, and/or functions performed by logic implemented in hardware, in accordance with an exemplary embodiment.

As stated above, there are problems with taint analysis using graphs for programs. Additional description of problems is now presented.

It is typical in a static analysis of a program to create a summary of methods that are used in the program, where the summary indicates at least data flow through a method. This way, as data is propagated through flows, a method already having a summary does not have to be analyzed a second time.

A fundamental question in static security analysis is how to partition the data-flow seeds—i.e., the statements in $$Src = \bigcup_{r \in Rules} Src_r,$$

where Rules is a set of security rules, and where a seed is a result from evaluating a source—such that (i) there is maximal reuse of functional data-flow summaries during the analysis, but (ii) the analysis does not increase to a very large size due to the size of a propagation graph. The propagation graph represents data flow (that is, where data goes in the program, specifically from sources to sinks). Meanwhile, a call graph represents control flow in the program (i.e., calls between methods).

To better understand these contradictory considerations, consider the simple example of program code 100 shown in FIG. 1. The snippet 100 of a program includes six statements 160-1 through 160-6 (from top of the page to bottom of the page), of which only statements 160-1 and 160-6 are marked.

In this example, there are two seeding statements 110-1 and 110-2; both correspond to calls to the method getParameter. The two resulting values (assigned into the string variables "name" and "gender") both flow into a helper method, removeWhitespaces, and thus the summary for this method built based on its first invocation 120-1 (where "name" is passed as the argument) can be reused for the second invocation 120-2. It is assumed for this example that a summary 130 indicates data flow from the argument to the return value. This example shows two summaries 130-1 and 130-2, each corresponding to the removeWhitespaces method.

However, following this "common" computation prefix, the values due to the string variable name and gender—assigned into the string variables sname and sgender—are used in distinct computation paths. If both seeds 150-1, 150-2 are tracked 140-1, 140-2 (respectively) simultaneously, then the analysis needs to maintain an in-memory propagation graph that spans both area X and area Y within the code. This limits the scalability of the analysis, and potentially also degrades performance.

So to summarize, the above example shows that tracking flows from multiple seeds simultaneously has the desirable effect of enabling greater reuse of method summaries, but on the negative side, exploring data flows due to multiple seeds limits the scalability of the analysis.

The standard solution, currently implemented in state-of-the-art commercial products, is to apply a very coarse heuristic: The analysis simply aggregates all the seeds into a single pool, and chooses fixed-size batches from within the pool arbitrarily (e.g., by iterating over the seeds in the pool and letting the first n seeds returned by the iterator form the next batch).

This solution is unsatisfactory for obvious reasons. First, there is the possibility of missing considerable reuse. Consider a situation with four seeds, $s_1 \ldots s_4$, and assume that $s_1$ and $s_4$ trigger the same summaries (as in the above example with removeWhitespaces), and the same is true of $s_2$ and $s_3$, but there is no reuse across $\{s_1, s_2\}$ and $\{s_3, s_4\}$. If the iterator induces an ordering of the seeds according to their indices, then the analysis will gain nothing by analyzing the seeds in pairs, where that could have a dramatic effect if $\{s_1, s_4\}$ and $\{s_2, s_3\}$ had been chosen.

Now further assume that $s_1$ and $s_2$ both yield very large propagation graphs. Analyzing these two seeds simultaneously (i.e., as part of the same batch) is thus not only redundant (because there is no reuse of method summaries), but can also lead the analysis to become time-consuming and use a large amount of resources because the analysis maintains a single propagation graph essentially comprising of both propagation graphs (for both $s_1$ and $s_2$).

The inventors are not aware of any technique or algorithm for improving upon the standard approach of partitioning the seeds into fixed-size batches. This appears to be a fundamental problem in static security analysis. The decision how to partition the seeds into batches critically impacts the scalability of the analysis.

Deciding statically on a partitioning of the seeds into batches can only be based on coarse heuristics. Otherwise, the analysis required to decide on an effective partitioning is as expensive as the ensuing security analysis and thus of minimal gain.

Exemplary embodiments herein propose an alternative approach of basing partitioning judgments on dynamic information produced from concrete runs of the subject program. An exemplary idea is to instrument the program, such that during (e.g., black-box) testing of the program or manual interaction with the program, information is gathered on the cone of influence of each seed. This information can then be leveraged toward deciding on a partitioning of the seeds into batches.

Figure 2B:
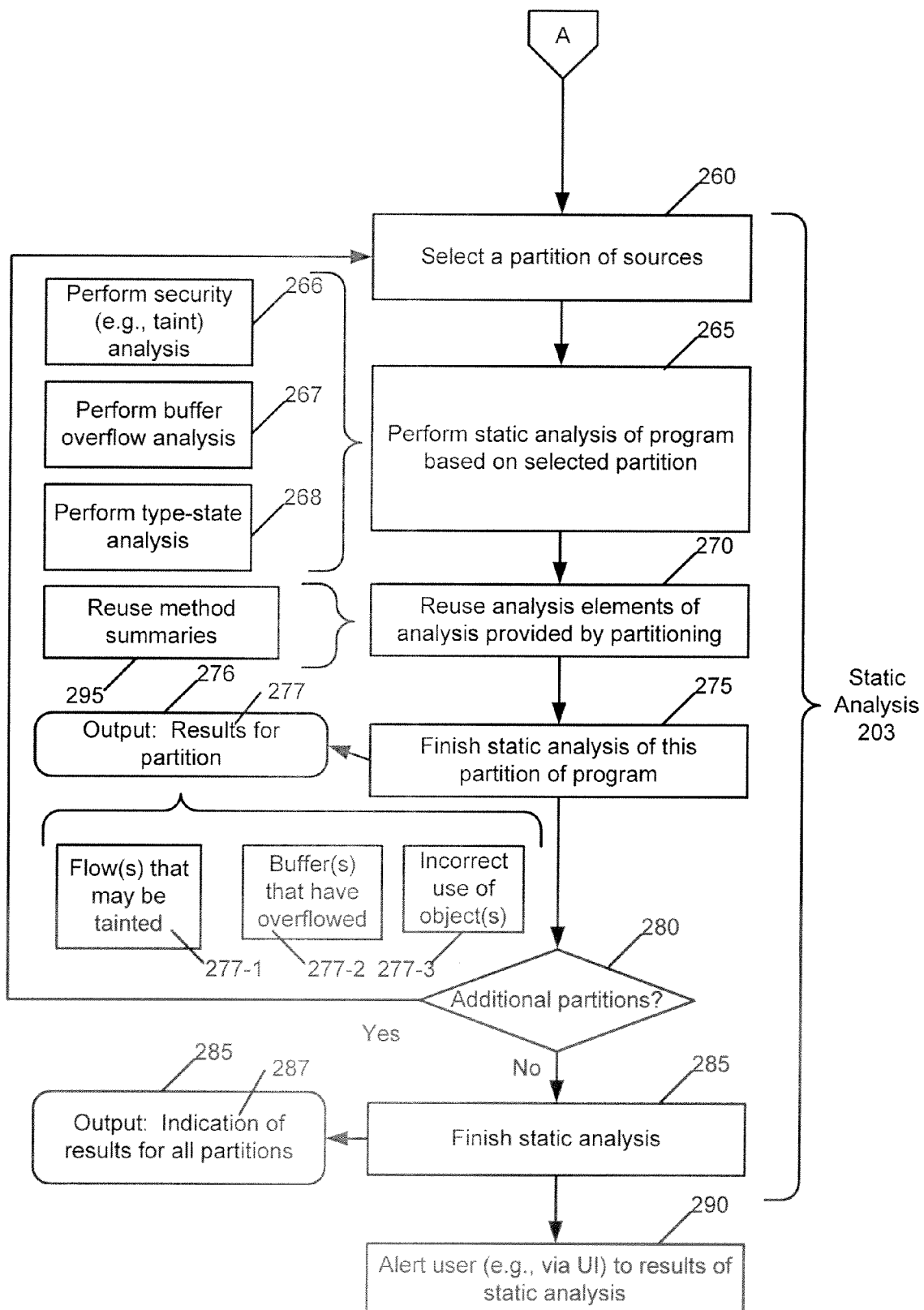

An exemplary embodiment is presented in conjunction with FIG. 2. FIG. 2 includes FIGS. 2A and 2B. FIG. 2 is a logic flow diagram for performing partitioning of static security analysis into sub-analyses using dynamic hints, and illustrates the operation of an exemplary method, a result of execution of computer program instructions embodied on a computer readable memory, and/or functions performed by logic implemented in hardware, in accordance with an exemplary embodiment. The blocks of FIG. 2 are assumed to be performed by a computing system, such as the computing system 335 shown in FIG. 3.

It should be noted that the description below primarily concerns security analysis, but buffer overflow analysis or typestate analysis may also be performed. To the extent necessary, changes for buffer overflow analysis or typestate analysis are discussed at appropriate points below.

In block 205, a program 207 is input for static analysis. The program would have statements 106 as shown in FIG. 1. In block 210, shallow static analysis 201 is used to identify elements within the subject application. Such elements could include, e.g., calls to HttpServletRequest.getParameter in a Java application for sources. It is noted that a shallow static analysis is a scan of the application's call graph to find, e.g., source and sink calls. The output is a complete set 208 of sources (in this example, $\{s_1, s_2, s_3, s_4\}$). The sources are defined by corresponding source statements. In block 215, the computing system instruments the program 205 to enable a subsequent dynamic analysis based on the located sources. The description below primarily concerns security analysis (block 291), but buffer overflow analysis (block 292), or typestate analysis (block 293) may also be performed. Basically, every static variant could have its dynamic counterpart: tracking buffer sizes dynamically, tracking typestate properties dynamically, and the like. The benefit in tracking dynamically the same property that is verified statically is that this enables direct observation into summary reuse opportunities to decide on an optimal partitioning based on the dynamic information. The concept of sources (or seeds) is general in data-flow analysis, and so this concept applies also in buffer overflow and typestate analyses. More specifically, the preliminary shallow static analysis in block 210 is still general. For taint analysis, the shallow static analysis 210 searches for sources, but more generally, the analysis 210 searches for data-flow seeds. Similarly, for typestate analysis, the seeds would be allocation sites of objects of interest (e.g., files or sockets), and for buffer overflow the seeds would be either buffers coming from the user or integral variables whose value is determined/affected by the user or both.

Each such source statement may be instrumented (block 218), such that in the example of block 219 an untrusted (e.g., string) object created due to a source call for a source statement is "labeled" with an identifier corresponding uniquely to the source statement. Labeling may be performed by adding a new field to the relevant class to which the untrusted object belongs and assigning the new field a suitable value (e.g., uniquely identifying the untrusted object and therefore the corresponding source statement). Untrusted objects are therefore associated uniquely with sources.

The program 207 may be further instrumented (block 216) such that each data-flow propagation operation further propagates labels from a source object corresponding to the source statement to a target object (e.g., such as a sink or a downgrader). In practice, this should be done mainly for string operations.

Blocks 216, 218, and 219 may be thought of as enabling call tracing (also called execution tracing) through a program. That is, the call tracing allows determination of a set of statements 160 traced by a flow from a source statement to some endpoint.

In block 215, for the buffer overflow and typestate analyses, appropriate instrumentation of the program 207 would be performed. For instance, the instrumentation would concern buffers for buffer overflow analysis and would concern objects and uses and states of the objects.

In block 220, an executable version 217 of the instrumented code is created. It is noted that block 220 is merely exemplary and is used in response to the program being in source code or object code. However, binary code or bytecode may also be used, which means that block 220 would not be necessary. It is further noted that, in general, instrumentation can be performed at all levels of code representation: source, bytecode, binary, and the like.

The next portion of the flow in FIG. 2A is performed using a dynamic analysis 202. In particular, the instrumented, executable program 217 is then exercised (via execution of the executable version 217 of the instrumented program code) in block 222 dynamically (e.g., using either a testing tool or via human interaction), such that concrete data can be extracted based on the instrumentation hooks inserted into the program 207 in block 215. As described above, the instrumentation hooks may allow call tracing from the source statements to some endpoint. In block 222, for the buffer overflow and typestate analyses, the execution concerns buffers for buffer overflow analysis and objects and uses and states of the objects.

The output 223 from the dynamic runs in block 222 is a mapping 224 from each source statement to an (under)approximation of its corresponding "slice" (i.e., the set of statements affected by execution of the program starting from that source statement). The example of FIG. 2A illustrates the mapping 224 as "$\{s_1, statements_1\}, \{s_2, statements_2\}, \{s_3, statements_3\}, \{s_4, statements_4\}$", where each "$statements_x$" represents the slice of statements 160 affected by the corresponding source statement $s_x$. It is further noted that a "slice" of statements 160 can be determined using call tracing. This mapping 224 enables insight into the overlap between distinct source statements, and to the size of the slice due to each such source statement, which in turn allows an educated decision how to partition the source statements into sets of sources.

Thus, in block 225, the sources are partitioned based on one or more considerations 230. Example considerations 230 are shown in blocks 240 and 245. In block 240 the consideration of slice size 230-1 is analyzed. That is, partitions should not be too large for scalability purposes. For instance, one can assume there are configurable limits on sizes of partitions (e.g., the size of any single partition cannot exceed Y statements or there can be only Z partitions that exceed Y statements) or one can apply learning from past runs of the analysis as to what constitutes a partition that is too large (e.g., if a run of the analysis takes over X hours on the current hardware comprising number of processors, memory size, and the like, for a particular partition, that partition is considered to be too large). Alternatively or additionally, in block 245, the consideration of overlap between slices is examined. Sources whose slices overlap to a large degree should be placed in the same partition for summary reuse. For instance, one can assume there are configurable limits on a degree of overlap (e.g., any degree of overlap between two slices cannot exceed Y statements) or one can apply learning from past runs of the analysis as to what constitutes overlap that is too large (e.g., if a run of the analysis takes over X hours on the current hardware comprising number of processors, memory size, and the like, for a particular degree of overlap for two particular slices of the partitions, that degree of overlap is considered to be too large). The output 255 is a number of partitions 257, including in this example the partition 257-1 of $\{s_1, s_4\}$ and the partition 257-1 of $\{s_2, s_3\}$.

It should be noted that the blocks 225 and 255 could be performed outside of a dynamic analysis 202. For instance, once the mapping 224 is determined, the mapping 224 could be stored for subsequent analysis.

Blocks 260-295 concern another static analysis 203. It is assumed below that the second static analysis 203 is a security analysis. However, the second static analysis can be one of a security analysis (block 266), a buffer overflow analysis (block 267), or a typestate analysis (block 268). As brief introductions, a buffer overflow analysis performs checking that data written into a buffer does not exceed buffer size; a typestate analysis performs checking that correct use is made of an object given the current state of the object (e.g., a file can only be read/written when the file is open).

In block 260, the computing system chooses a partition 257-x of the partitions 257. In block 265, the computing system performs static analysis of the program 207 based on the selected partition. A typical static security analysis for this case could include seeding source statements in the selected partition and performing taint analysis based on the seeded statements. For instance (see block 268), the "seeds" (which are considered tainted) are followed from corresponding source statements through flows, e.g., using a propagation graph, until, e.g., sink statements or downgrader statements are reached by the flows. Flows passing from source statements to sink statements without passing through downgrader statements are considered security vulnerabilities that should be flagged (e.g., to a user) or corrected. For buffer overflow (block 267), a violation occurs when a program writes beyond a buffer size. For a typestate analysis (block 268), the analysis is concerned with incorrect usage of objects (e.g., reading from a closed file).

In block 270, the computing system reuses analysis elements of the analysis provided by the partitioning. For instance, as illustrated by block 295, the computing system can reuse method summaries that are found and created during the static analysis of the program 207. Additional reuse may also be made of type-inference results, constant-propagation results, and the like. These types of reuses would be useful for the security analysis 266, the buffer overflow analysis 267, and the typestate analysis 268.

In block 275, the computing system finishes the static analysis of this partition of the program 207. For instance, once the taint has been traced from the seeded source statements through all possible flows, the static analysis on this partition could end. The output 276 includes the results 277 for the partition. The results for a security analysis could include, e.g., that a particular flow ended at sink statement X without being downgraded (thereby indicating a security vulnerability) (see results 277-1), that a taint for a flow was considered to be properly downgraded, and the like. For buffer overflow analysis, the buffer(s) that have been determined to have overflowed (see results 277-2). For typestate analysis, the results 277-3 may be the incorrect use of the object(s) for the current state of the objects.

In block 280, it is determined if there are additional partitions. If so (block 280=Yes), the flow proceeds to block 260, where another partition 257-1 of the set of partitions 257 is selected the blocks 265, 270, and 275 are performed again. If there are no additional partitions (block 280=No), in block 285, the computing system finishes the static analysis, where the output 285 is a set of indications 287 of results 277 for all of the partitions. In an example, this set of indications 287 of results 277 may be written to memory for subsequent analysis or sending to a user over, e.g., a network. It is also possible to output the set of indications 287 of results 277, immediately, or after some delay, to, e.g., a UI (user interface) to alert (block 290) a user to the set of results 287. As an example, an indication 287 for the result 277-1 may be "The flow from source $Src_1$ to sink $Snk_1$ does not pass through downgrader statements". An indication 287 for the result 277-2 may be "The buffer $Buf_1$ overflows at a write to the buffer at $statement_2$". An indication 287 for the result 277-3 may be "The object $File_1$ is not open at when the file is read at $statement_2$".

Figure 3:
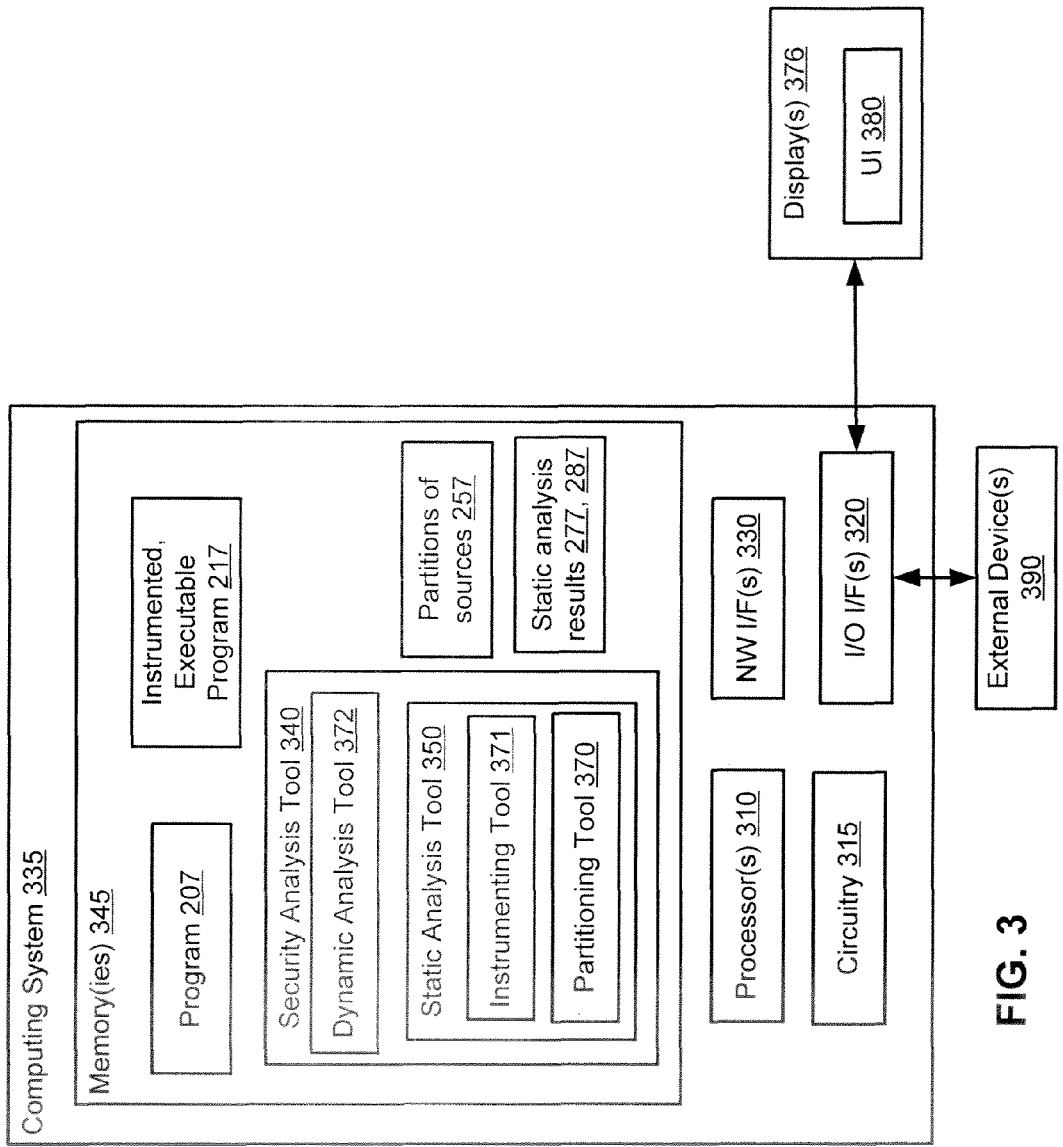
FIG. 3 is an example of a system suitable for performing the exemplary embodiments herein.

Referring to FIG. 3, this figure is an overview of a computing system 335 suitable for use with exemplary embodiments herein. The computing system 335 comprises one or more memories 345, one or more processors 310, one or more I/O interfaces 320, and one or more wired or wireless network interfaces 330. Alternatively or in addition to the one or more processors 310, the computing system 335 may comprise circuitry 315. The computing system 335 is coupled to or includes one or more displays 376 and one or more external device(s) 390. This example provides a program 207, an instrumented, executable program 217, partitions 257 of sources, and static analysis results 277, 287 (e.g., where the results 277 from a single partition make up a portion of results 287) in the one or more memories 345. The one or more memories 345 also include a security analysis tool 340 that includes a dynamic analysis tool 372, and a static analysis tool 350. The static analysis tool 350 includes an instrumenting tool 371 and a partitioning tool 370. The security analysis tool 340, in an exemplary embodiment, is implemented computer-readable program code that is executable by the one or more processors 310 to cause the computing system 335 to perform one or more of the operations described herein. In another example, the operations may also be performed, in part or completely, by circuitry 315 that implements logic to carry out the operations. The circuitry 315 may be implemented as part of the one or more processors 310 or may be separate from the one or more processors 310. The processors 310 may be any processing unit, such as a digital signal processor and/or single-core or multi-core general purpose processors. The circuitry 315 may be any electronic circuit such as an application specific integrated circuit or programmable logic. The memories 345 may comprise non-volatile and/or volatile RAM, cache memory, NAND-based flash memory, long term storage (e.g., hard drive), and/or read only memory. The one or more I/O interfaces 320 may include interfaces through which a user may interact with the computing system 335. The display(s) 376 may be a touchscreen, flatscreen, monitor, television, projector, as examples.

A user interacts with the security analysis tool 340 through the UI 380 in an exemplary embodiment or through the network interface(s) 330 in another non-limiting embodiment. The external device(s) 390 enable a user to interact in one exemplary embodiment with the computing system 335 and may include a mouse, trackball, keyboard, and the like. The network interfaces 330 may be wired or wireless and may implement a number of protocols, such as cellular or local area network protocols. The elements in computing system 335 may be interconnected through any technology, such as buses, traces on abound, interconnects on semiconductors, and the like.

In this example, the security analysis tool 340 includes a dynamic analysis tool 372 that performs the dynamic analyses operations (e.g., dynamic analysis 202) described above. The security analysis tool 350 includes a static analysis tool 350 that performs the static analyses operations (e.g., static analyses 201 and 203) described above. As an example, the static analysis tool 350 includes an instrumenting tool 371 to perform the instrumenting of the program 207 and a partitioning tool 470 that partitions the sources into partitions 257. In most cases, a static analysis is performed on some version of the source code for the program 360, although object or even executable code may be used. Other elements that might be used are not shown. For instance, if source code is instrumented by the instrumenting tool 317, a compiler or linker may be used to create the executable program 217.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable storage medium does not include a propagating wave.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   performing a first static analysis on a program to locate source statements within the program that are data flow seeding statements for a type of static analysis to be performed in a second static analysis;
   instrumenting the program to enable a subsequent dynamic analysis based on the located data flow seeding statements;
   executing the instrumented program and performing, during execution, the dynamic analysis to determine individual sets of statements in the program affected by execution of the instrumented program starting at a corresponding data flow seeding statement;
   partitioning the data flow seeding statements into partitions based on the sets of statements and one or more considerations, each partition comprising one or more of the data flow seeding statements, wherein the data flow seeding statements in each of the partitions are different;
   performing a second static analysis of the program based on the partitions to produce results indicating any errors for the type of static analysis performed in the second static analysis, at least by:
      selecting one of the partitions, performing a static analysis of the program at least by, for all of the data flow seeding statements in the selected partition, starting at each of the data flow seeding statements in the selected partition, and following a first data flow from the data flow seeding statement through additional statements in the program and to an endpoint of the first data flow, wherein the endpoint is based on the type of the second static analysis; and
      selecting a different one of the partitions, and performing another, subsequent static analysis of the program at least by, for all of the data flow seeding statements in the different partition, starting at each of the data flow seeding statements in the different partition, and following a second data flow from the data flow seeding statement through additional statements in the program and to an endpoint of the second data flow, wherein the second data flow is different from the first data flow, wherein the endpoint is based on the type of the second static analysis, and wherein the subsequent static analysis reuses analysis elements of analysis provided by the static analysis performed using the previously selected partition; and
   performing a security analysis determining whether there are flows passing from data flow seeding statements to sink statements without passing through downgrader statements, wherein the results comprise flows passing from data flow seeding statements to sink statements without passing through downgrader statements; and
   outputting the results.

2. The method of claim 1, wherein the second static analysis further comprises one of buffer overflow analysis or typestate analysis.

3. The method of claim 1, wherein:
performing a first static analysis further comprises performing the first static analysis to locate data flow seeding statements within a program;
instrumenting further comprises instrumenting the program to enable the subsequent dynamic analysis based on the data flow seeding statements;
executing further comprises executing the instrumented program and performing during execution a dynamic taint analysis to determine individual sets of statements affected by a corresponding data flow seeding statement; and
partitioning further comprises partitioning the sets of data flow seeding statements into partitions based on one or more considerations, each partition comprising one or more of the data flow seeding statements.

4. The method of claim 3, wherein:
performing during execution the dynamic taint analysis further comprises recording call traces to identify what statements are affected by execution of the program starting from the data flow seeding statements.

5. The method of claim 2, wherein:
performing a first static analysis further comprises performing the first static analysis to locate buffers within the program;
executing further comprises executing the instrumented program and performing during execution an analysis to determine individual sets of statements in the program affected by a corresponding buffer;
partitioning further comprises partitioning the sets of data flow seeding statements into partitions based on one or more considerations, each partition comprising statements affecting one or more of the buffers during the execution of the instrumented program starting at a data flow seeding statement in the partition;
the second static analysis comprises a buffer overflow analysis determining whether any buffers overflow; and
the results comprise buffers that have been determined to have overflowed.

6. The method of claim 2, wherein:
performing a first static analysis further comprises performing the first static analysis to locate objects within the program;
executing further comprises executing the instrumented program and performing during execution an analysis to determine individual sets of statements in the program affected by a corresponding object;
partitioning further comprises partitioning the sets of data flow seeding statements into partitions based on one or more considerations, each partition comprising statements affecting one or more of the objects during the execution of the instrumented program starting at a data flow seeding statement in the partition;
the second static analysis comprises a typestate analysis determining whether correct uses are made of objects given current states of the objects; and
the results comprise incorrect uses made of objects given the current states of the objects.

7. The method of claim 1, wherein instrumenting the program comprises labeling unfrosted objects created due to calls by data flow seeding statements with an identifier corresponding uniquely to the corresponding data flow seeding statement.

8. The method of claim 7, where labeling comprises adding new fields to relevant classes to which the untrusted objects belong and assigning the new fields suitable values providing unique identification of the untrusted objects.

9. The method of claim 1, wherein instrumenting the program comprises instrumenting the program such that each data-flow propagation step further propagates labels from source objects corresponding to data flow seeding statements to target objects.

10. The method of claim 9, wherein instrumenting the program such that each data-flow propagation step further propagates labels from the source object to the target object is performed for source objects performing string operations.

11. The method of claim 1, wherein partitioning further comprises partitioning the data flow seeding statements into partitions based on a consideration of overlap of statements between the sets of statements.

12. The method of claim 1, wherein partitioning further comprises partitioning the data flow seeding statements into partitions based on a consideration of sizes of the sets of statements.

13. The method of claim 1, wherein performing another, subsequent static analysis reuses analysis elements of analysis provided by the previous static analysis.

14. The method of claim 1, wherein performing a second static analysis on the partitions of the program to produce results further comprises selecting partitions and performing static analyses based on the selected partitions until all partitions have been selected and all static analyses have been performed based on the selected partitions.

15. The method of claim 14, wherein, for performing a second static analysis on the partitions of the program to produce results, any subsequent static analysis reuses analysis elements of analyses provided by previously performed static analyses.

16. The method of claim 1, wherein the individual sets of statements comprise statements in the program affected by execution of the program starting from a corresponding data flow seeding statement.

17. The method of claim 1, wherein instrumenting the program to enable a subsequent dynamic analysis based on the located source statements further comprises enabling call tracing through the program to provide subsequent determination of a set of statements traced by a data flow from a data flow seeding statement to some endpoint, and wherein executing the instrumented program and performing, during execution, the dynamic analysis determines the set of statements traced by the data flow from a data flow seeding statement to some endpoint.

* * * * *